(12) United States Patent
Pandey et al.

(10) Patent No.: US 12,407,573 B2
(45) Date of Patent: Sep. 2, 2025

(54) METHOD AND SYSTEM FOR GROUP AWARE DISTRIBUTED CONFIGURATION TRANSACTIONS MANAGEMENT ACROSS NETWORK DEVICES

(71) Applicant: HCL Technologies Limited, New Delhi (IN)

(72) Inventors: Vidhu Shekhar Pandey, Noida (IN); Ramesh Sriraman, Chennai (IN)

(73) Assignee: HCL Technologies Limited, New Delhi (IN)

( * ) Notice: Subject to any disclaimer, the term of this patent is extended or adjusted under 35 U.S.C. 154(b) by 73 days.

(21) Appl. No.: 18/401,501

(22) Filed: Dec. 31, 2023

(65) Prior Publication Data

US 2024/0223453 A1 Jul. 4, 2024

(30) Foreign Application Priority Data

Jan. 4, 2023 (IN) .............................. 202311000568

(51) Int. Cl.
*H04L 41/084* (2022.01)
*H04L 41/0813* (2022.01)
*H04L 41/0893* (2022.01)

(52) U.S. Cl.
CPC ........ *H04L 41/084* (2013.01); *H04L 41/0813* (2013.01); *H04L 41/0893* (2013.01)

(58) Field of Classification Search
CPC ............... H04L 41/084; H04L 41/0813; H04L 41/0893
See application file for complete search history.

(56) References Cited

U.S. PATENT DOCUMENTS 8,577,960 B2 11/2013 Boller et al.
8,953,494 B2 2/2015 Purkayastha et al.
(Continued)

FOREIGN PATENT DOCUMENTS

| DE | 112016004860 T5 | 7/2018 |
|---|---|---|
| EP | 2985951 B1 | 10/2017 |
| EP | 3599741 A1 | 1/2020 |

OTHER PUBLICATIONS

Stefan Wallin, Claes Wikstrom; Automating Network and Service Configuration Using NETCONF and Yang; pp. 1 to 13.
(Continued)

*Primary Examiner* — Chris Parry
*Assistant Examiner* — Steven C Nguyen
(74) *Attorney, Agent, or Firm* — Kendal M. Sheets (57) ABSTRACT

The invention relates to method and system for managing distributed configuration transactions across a plurality of network devices. The method includes for each network device, defining and installing, by a network application, a Yet Another Next Generation (YANG) data model on the network device that is used to create groups of one or more of configuration data subtrees of the YANG data model or XPath references corresponding to the one or more of the configuration data subtrees of the installed YANG data model, and establishing a communication channel with the network device to exchange the distributed transaction group YANG data model via a NETCONF protocol. The method further includes generating distributed transaction group lookup table based on the distributed transaction group YANG data model, and simultaneously modifying configuration data subtrees corresponding to a selected group ID as a unit via transaction multiplexer module using distributed transaction group lookup table.

20 Claims, 5 Drawing Sheets

(56) References Cited

U.S. PATENT DOCUMENTS

| | | | |
|---|---|---|---|
| 9,258,132 | B2 | 2/2016 | Vieira |
| 10,250,441 | B2 | 4/2019 | Liu |
| 11,323,316 | B2 | 5/2022 | Zhang et al. |
| 2002/0147764 | A1 | 10/2002 | Krupczak |
| 2019/0132213 | A1* | 5/2019 | Na .................. H04L 41/0226 |
| 2019/0245743 | A1* | 8/2019 | A .................... H04L 41/0823 |
| 2020/0328948 | A1* | 10/2020 | Nayyar ............ H04L 41/0803 |
| 2023/0006881 | A1* | 1/2023 | Krishnamurthy ... H04L 41/0816 |
| 2023/0367748 | A1* | 11/2023 | Li .................... H04L 41/145 |

OTHER PUBLICATIONS

Jürgen Schönwälder, Martin Björklund, Phil Shafer; Network Configuration Management Using NETCONF and Yang; Sep. 2010; pp. 166 to 173; IEEE Communications Magazine.

* cited by examiner

FIG. 1

| Group-id 202 | Node-id 204 | Session-id 206 | XPath (S) 208 |
|---|---|---|---|
| 1 | 1 | 1 | A |
| 2 | 1 | 1 | B |
| 1 | 2 | 2 | C |
| 2 | 2 | 2 | D |
| 1 | 3 | 3 | E, F |

METHOD AND SYSTEM FOR GROUP AWARE DISTRIBUTED CONFIGURATION TRANSACTIONS MANAGEMENT ACROSS NETWORK DEVICES

TECHNICAL FIELD

Generally, the invention relates to computer networks and more specifically, to a method and system for managing distributed configuration transactions across a plurality of network devices.

BACKGROUND

A computer network includes a set of computers (for example, personal computers, servers, network hardware, etc.) or specialized general-purpose hosts that share resources and data by communicating with each other through various network protocols. Further, network devices may be physical or virtual entities (for example, routers, firewalls, gateways, gNB, etc.). The network devices typically expose a management interface through which they may be managed locally or remotely. NETCONF is a standard network configuration protocol defined by Internet Engineering Task Force (IETF) that provides mechanisms to install, manipulate, and delete configurations on the network devices. NETCONF protocol includes sufficient primitives upon which transaction-oriented operations may be built for handling configuration changes on multiple network devices. However, it does not provide a single method to ensure such distributed configuration operations.

Today, various systems are available for managing configuration transactions across the network devices. However, in the existing systems, a network application needs to handle complex distributed transaction semantics on the network devices. This involves establishing connection with each network device and ensuring the successfully committed configuration on each network device, otherwise rolling back fully to the original states if any of the transactions fails. Also, this requires datastore lock handling on the network devices, check pointing database commits, handling confirmed-commits, rollbacks, and the like.

Therefore, there is a need in the present state of art for the management protocol to expose a single method that may perform configuration and management tasks on one or more network devices simultaneously as a unit.

SUMMARY

In one embodiment, a method for managing distributed configuration transactions across a plurality of network devices is disclosed. The method may be performed by a configuration management device. The method may include defining and installing, by a network application, a Yet Another Next Generation (YANG) data model on the network device that is used to create groups of one or more of configuration data subtrees of the YANG data model or XPath references corresponding to the one or more of the configuration data subtrees of the installed YANG data model. Each of the groups includes a unique group ID and the XPath references in a distributed transaction group YANG data model. The configuration management device may include a transaction multiplexer module, and the transaction multiplexer module may be a part of a Network Configuration (NETCONF) client application. The method may further include establishing, for each network device from a plurality of network devices, a communication channel with the network device to exchange the distributed transaction group YANG data model via a NETCONF protocol. The method may further include generating a distributed transaction group lookup table based on the distributed transaction group YANG data model of each of the plurality of network devices through the transaction multiplexer module, upon establishing the communication channel. The method may further include simultaneously modifying configuration data subtrees corresponding to a selected group ID as a unit in the plurality of network devices via the transaction multiplexer module using the distributed transaction group lookup table.

In another embodiment, a system for managing distributed configuration transactions across a plurality of network devices is disclosed. The system may include a configuration management device including a processor and a memory communicatively coupled to the processor, which, on execution, may cause the processor to define and install, by a network application, a Yet Another Next Generation (YANG) data model on the network device that is used to create groups of one or more of configuration data subtrees of the YANG data model or XPath references corresponding to the one or more of the configuration data subtrees of the installed YANG data model. Each of the groups includes a unique group ID and the XPath references in a distributed transaction group YANG data model. The configuration management device may include a transaction multiplexer module, and the transaction multiplexer module may be a part of a Network Configuration (NETCONF) client application The processor-executable instructions, on execution, may further cause the processor to establish a communication channel with the network device to exchange the distributed transaction group YANG data model via a NETCONF protocol. The processor-executable instructions, on execution, may further cause the processor to generate a distributed transaction group lookup table based on the distributed transaction group YANG data model of each of the plurality of network devices through the transaction multiplexer module upon establishing the communication channel. The processor-executable instructions, on execution, may further cause the processor to simultaneously modify configuration data subtrees corresponding to a selected group ID as a unit in the plurality of network devices via the transaction multiplexer module using the distributed transaction group lookup table.

In yet another embodiment, a non-transitory computer-readable medium storing computer-executable instruction for managing distributed configuration transactions across a plurality of network devices by a configuration management device is disclosed. The stored instructions, when executed by a processor, may cause the processor to perform operations including defining and installing, by a network application, a Yet Another Next Generation (YANG) data model on the network device that is used to create groups of one or more of configuration data subtrees of the YANG data model or XPath references corresponding to the one or more of the configuration data subtrees of the installed YANG data model. Each of the groups includes a unique group ID and the XPath references in a distributed transaction group YANG data model. The configuration management device may include a transaction multiplexer module, and the transaction multiplexer module may be a part of a Network Configuration (NETCONF) client application. The operations may further include establishing, for each network device from a plurality of network devices, a communication channel with the network device to exchange the distributed transaction group YANG data model via a NET- CONF protocol. The operations may further include generating a distributed transaction group lookup table based on the distributed transaction group YANG data model of each of the plurality of network devices through the transaction multiplexer module upon establishing the communication channel. The operations may further include simultaneously modifying configuration data subtrees corresponding to a selected group ID as a unit in the plurality of network devices via the transaction multiplexer module using the distributed transaction group lookup table.

It is to be understood that both the foregoing general description and the following detailed description are exemplary and explanatory only and are not restrictive of the invention, as claimed.

BRIEF DESCRIPTION OF THE DRAWINGS

The present application can be best understood by reference to the following description taken in conjunction with the accompanying drawing figures, in which like parts may be referred to by like numerals

DETAILED DESCRIPTION OF THE DRAWINGS

The following description is presented to enable a person of ordinary skill in the art to make and use the invention and is provided in the context of particular applications and their requirements. Various modifications to the embodiments will be readily apparent to those skilled in the art, and the generic principles defined herein may be applied to other embodiments and applications without departing from the spirit and scope of the invention. Moreover, in the following description, numerous details are set forth for the purpose of explanation. However, one of ordinary skill in the art will realize that the invention might be practiced without the use of these specific details. In other instances, well-known structures and devices are shown in block diagram form in order not to obscure the description of the invention with unnecessary detail. Thus, the present invention is not intended to be limited to the embodiments shown, but is to be accorded the widest scope consistent with the principles and features disclosed herein.

While the invention is described in terms of particular examples and illustrative figures, those of ordinary skill in the art will recognize that the invention is not limited to the examples or figures described. Those skilled in the art will recognize that the operations of the various embodiments may be implemented using hardware, software, firmware, or combinations thereof, as appropriate. For example, some processes can be carried out using processors or other digital circuitry under the control of software, firmware, or hard-wired logic. (The term "logic" herein refers to fixed hardware, programmable logic and/or an appropriate combination thereof, as would be recognized by one skilled in the art to carry out the recited functions). Software and firmware can be stored on computer-readable storage media. Some other processes can be implemented using analog circuitry, as is well known to one of ordinary skill in the art. Additionally, memory or other storage, as well as communication components, may be employed in embodiments of the invention.

Figure 1:
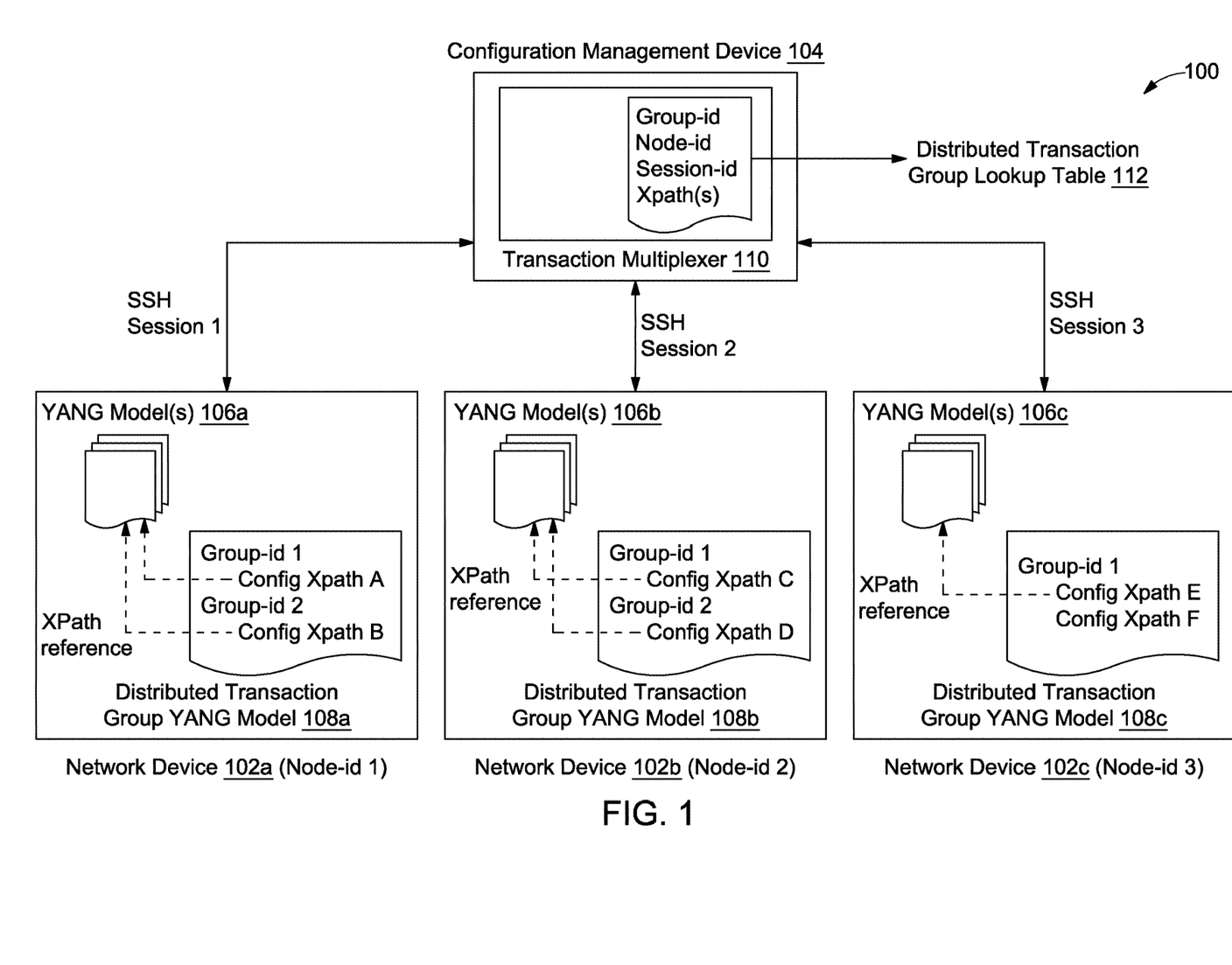
FIG. 1 illustrates a block diagram of a system for managing distributed configuration transactions across network devices, in accordance with some embodiments of the present disclosure.

Referring now to FIG. 1, a system 100 for managing distributed configuration transactions across network devices 102a, 102b, and 102c is illustrated, in accordance with some embodiments of the present disclosure. The system 100 simplifies handling of Network Configuration (NETCONF) distributed transactions across the network devices 102a, 102b, and 102c for network applications. The system 100 handles changes across the network devices 102a, 102b, and 102c through a configuration management device 104. The configuration management device 104 may correspond to a NETCONF client and each of the network devices 102a, 102b, and 102c may correspond to NETCONF servers. Further, Yet Another Next Generation (YANG) data models 106a, 106b, and 106c may be installed in the network devices 102a, 102b, and 102c, respectively. The YANG data models 106a, 106b, and 106c may be used for grouping one or more of configuration data subtrees or XPaths that are part of distributed configuration data. Each of these groups represented by a unique group ID may include XPath references to the one or more configuration data subtrees of the network device specific YANG data models 106a, 106b, and 106c.

In some embodiments, the configuration management device 104 may define a group ID (for example, a group ID 1, and a group ID 2) for one or more of configuration data subtrees of the YANG data model 106a for the network device 102a. Similarly, in some embodiments, the configuration management device 104 may define group IDs for one or more of configuration data subtrees of the YANG data models 106b and 106c for the network devices 102b and 102c. The group IDs may be defined and added to distributed transaction group YANG data models 108a, 108b, and 108c along with an XPath reference corresponding to each of the one or more of the configuration data subtrees. Each of the distributed transaction group YANG data models 108a, 108b, and 108c may include the group IDs and XPath references corresponding to each of the one or more of the configuration data subtrees of the YANG data models 106a, 106b, and 106c. In some embodiments, the group IDs may be defined for the configuration data subtrees in run-time. Alternatively, in some embodiments, the group ID may be defined for the configuration data subtrees during initialization.

Further, it should be noted that the configuration management device 104 may include a transaction multiplexer 110. The transaction multiplexer 110 may be a part of the NETCONF client.

In other words, each network device (i.e., a network device with configurations that are candidate for a distributed transaction) may install a specific YANG data model (for example, a distributed transaction group YANG data model). The YANG data model may import other YANG data models and define a list of groups that may include an Xpath reference to each of configuration data subtrees which may form a part of distributed configuration. Each such group may be identified with a group ID. Further, initial groups and Xpath configurations may be loaded from a startup datastore on each network device that may be defined at the time of network design.

Further, the configuration management device 104 may establish communication channels (for example, Secure Shell (SSH) communication channels or Transport Layer Security (TLS) communication channels) with the network devices 102a, 102b, and 102c. The communication channels may be established to exchange the distributed transaction group YANG data models 108a, 108b, and 108c via a NETCONF protocol. When the NETCONF client or the configuration management device 104 establishes a communication channel or NETCONF session with a network device, a corresponding YANG data model may be advertised along with other YANG data models during capabilities exchange via a hello message. The NETCONF client may have multiple such sessions with the network devices i.e., 102a, 102b, and 102c.

After establishing the communication channels a distributed transaction group lookup table 112 may be generated by the configuration management device 104. The distributed transaction group lookup table 112 may be generated based on the distributed transaction group YANG models 108a, 108b, and 108c of the network devices 102a, 102b, and 102c through the transaction multiplexer 110.

In other words, after establishing connection, the NETCONF client may perform a get-config operation to obtain initial list of groups in each network device and maintain the distributed transaction group lookup table 112. Further, the NETCONF client may map group IDs, a network device node ID, session IDs, and Xpath references of the configuration data subtrees for each network device involved in the distributed configuration. This is further explained in conjunction with FIG. 2. The group list on each network device may be modified later by network applications by performing an edit-config procedure.

As will be explained in detail in conjunction with FIG. 3, the configuration management device 104 may simultaneously modify configuration data subtrees corresponding to a selected group ID as a unit in the network devices 102a, 102b, and 102c via the transaction multiplexer 110 using the distributed transaction group lookup table 112. In some embodiments, the distributed configuration data for the selected group ID may be received in an XML encode file from a network application. It should be noted that the XML file may include distributed configuration data for each of the plurality of network devices falling under a group. Further, in some embodiments, the XML file may be transformed into an individual edit configuration Remote Procedure Call (RPC) message for each network device via the transaction multiplexer 110 based on the distributed transaction group lookup table 112. The edit configuration RPC message corresponding to a network device may include the distributed configuration data corresponding to the network device node ID.

Additionally, in some embodiments, the configuration management device 104 may transmit the edit configuration RPC message from the transaction multiplexer 110 to each network device over the communication channel. Moreover, data corresponding to the configuration data subtrees may be deleted for the selected group ID in one or more of the network devices 102a, 102b, and 102c using the modified distributed configuration data using the distributed transaction group lookup table 112.

A distributed transaction group YANG data model on each network device may define distributed configuration groups. This may be modeled at the time of network device design and installed on each network device. Further, each group ID may be a unique ID on a network device, however, a group ID may be shared with one or more of network devices 102a, 102b, and 102c. Each network device may create groups and add one or more of the configuration data subtrees and the Xpath reference corresponding to each of the one or more of the configuration data subtrees to these groups at startup. It should be noted that there may be one or more than one subtree in a group on a network device. The Xpath references in the distributed transaction group YANG data model may be references to the actual configuration subtrees defined in the device specific YANG models on that network device.

For example, Xpath A in the distributed transaction group YANG data model 108a corresponds to a configuration subtree in the YANG data model 106a of the network device 102a (associated node ID: "Node-id 1"). Group ID for Xpath A is "Group-id 1". Similarly, the distributed transaction group YANG data model 108a of the network device 102a (associated node ID: "Node-id 1") includes Xpath B with "Group-id 2". Similarly, the distributed transaction group YANG data model 108b of the network device 102b (associated node ID: "Node-id 2") includes Xpath C and Xpath D with associated group IDs "Group-id 1" and "Group-id 2", respectively. Similarly, the distributed transaction group YANG data model 108c of the network device 102c (associated node ID: "Node-id 3") includes Xpath E and Xpath F, each with an associated group ID "Group-id 1". Therefore, Xpaths A, C, E, and F form a group with the common group ID "Group-id 1" even though each of these Xpaths is committed to a different network device (i.e., Xpath A is committed to the network device 102a ("Node-id 1"), Xpath C is committed to the network device 102b ("Node-id 2"), and Xpaths E and F are committed to the network device 102c ("Node-id 3")). Therefore, by targeting a selected group ID, configuration data may be simultaneously edited for multiple network devices as a unit.

The YANG data models 106a, 106b, and 106c may be supported by the network devices 102a, 102b, and 102c, respectively, whose Xpath references may be held in the groups defined in distributed transaction group YANG models 108a, 108b, and 108c, respectively. During the NETCONF SSH session establishment between the NETCONF client and the NETCONF servers, the network devices 102a, 102b, and 102c may send the YANG data models 106a, 106b, and 106c, respectively, and the distributed transaction group YANG data models 108a, 108b, and 108c, respectively, as a capability to the NETCONF client in response to a respective hello message along with other capabilities and the session ID. The session IDs (such as, the SSH session ID "SSH session 1" corresponding to the SSH session established between the configuration management device 104 and the network device 102a) are required to push commits on each network device via RPC messages.

Therefore, a single interface provides function for making the distributed configuration changes on all the network devices in a group using the group ID. The NETCONF client may implement the transaction multiplexer 110 that exposes a single interface function for network applications to allow configuration changes to be done on multiple network devices. The transaction multiplexer 110 may build and maintain the distributed transaction group lookup table 112 learning from every established network device connection. The transaction multiplexer 110 may be responsible for translating the configurations provided by the network application and distributing the configurations on each network device, committing the changes as well as managing the transactions.

A NETCONF protocol may include sufficient primitives upon which transaction-oriented operations may be built for multiple network device, however, natively does not provide a single interface to take care of these transaction-oriented operations. The system 100 enables a single interface for the network applications to perform distributed transactions on multiple network devices by grouping a set of distributed configurations across the multiple network devices and handling them as a unit.

Figure 2:
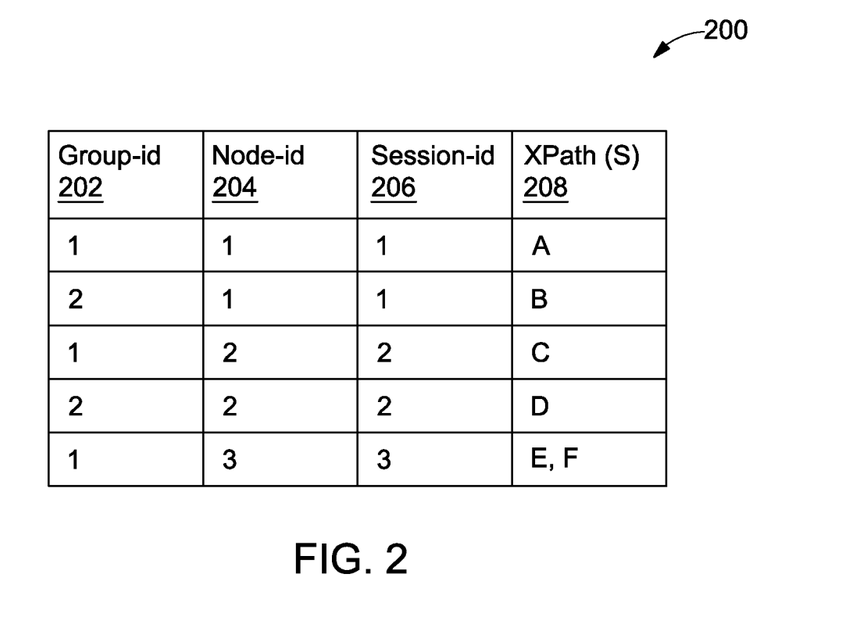
FIG. 2 illustrates a distributed transaction group lookup table, in accordance with some embodiments of the present disclosure.

Referring now to FIG. 2, an exemplary distributed transaction group lookup table 200 (same as the look up table 112) is illustrated, in accordance with some embodiments of the present disclosure. FIG. 2 is explained in conjunction with FIG. 1. The distributed transaction group lookup table 200 includes a mapping of a group ID 202, a node ID corresponding to each of the network devices 102a, 102b, and 102c, a session ID 206 corresponding to the communication channel established between the configuration management device 104 and each of the network devices 102a, 102b, and 102c, and an Xpath reference 208 of each of the configuration data subtrees in YANG data models of each of the network devices 102a, 102b, and 102c.

Figure 3:
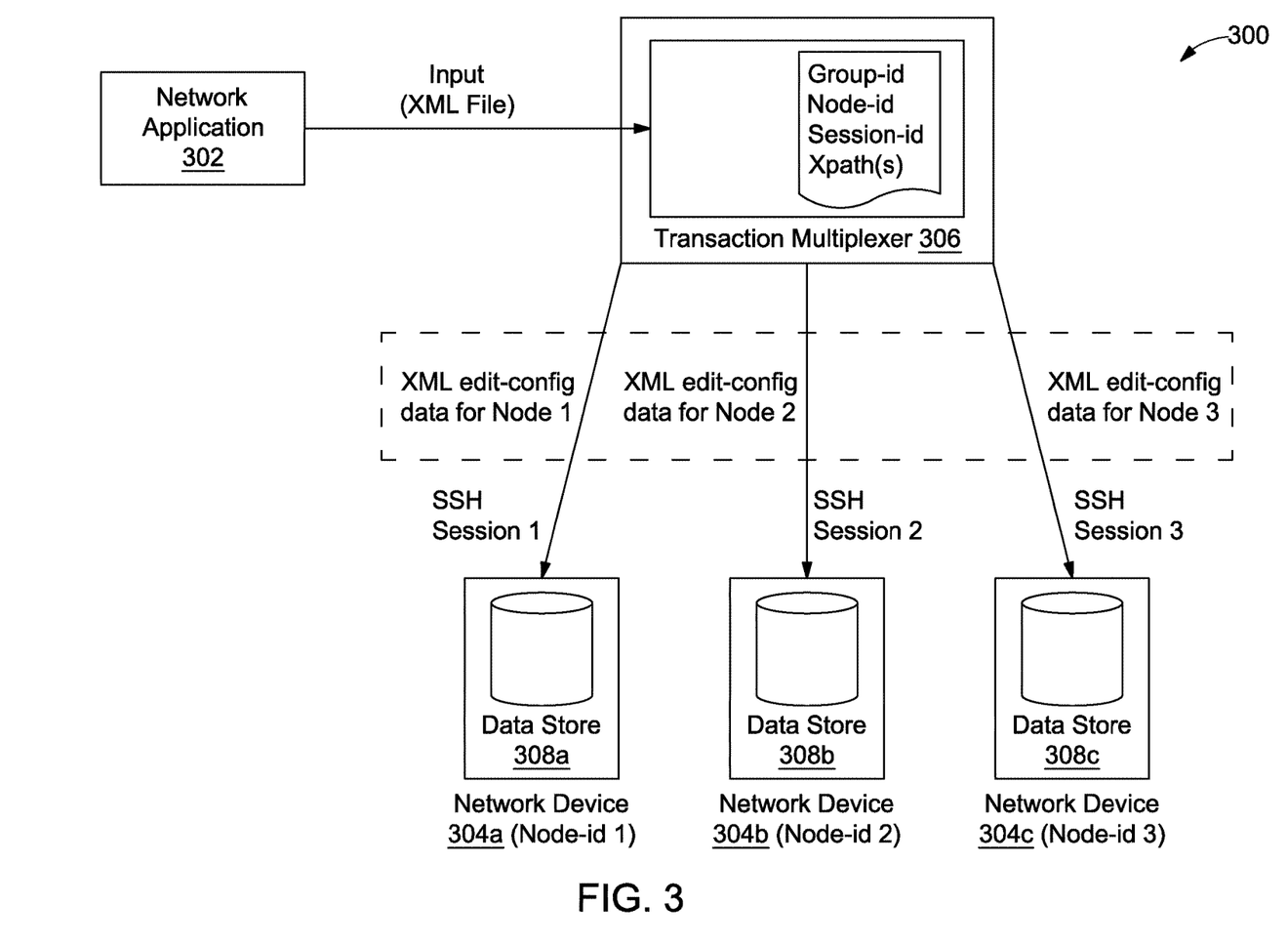
FIG. 3 illustrates a block diagram of an exemplary system simultaneously modifying configuration data subtrees corresponding to a selected group ID as a unit across network devices, in accordance with some embodiments of the present disclosure.

Referring now to FIG. 3, a system 300 for simultaneously modifying configuration data subtrees corresponding to a selected group ID as a unit across network devices is illustrated, in accordance with some embodiments of the present disclosure. FIG. 3 is explained in conjunction with FIGS. 1-2. The system 300 includes a network application 302, network devices 304a, 304b, and 304c (as analogous to the network devices 102a, 102b, and 102c), and a transaction multiplexer 306 (as analogous to the transaction multiplexer 110). Further, the network devices 304a, 304b, and 304c include data stores 308a, 308b, and 308c, respectively.

The network application 302 may send the distributed configuration data in a single XML to the NETCONF client or the transaction multiplexer 306. The group ID may club all the distributed configurations together. The target may mention the configuration datastore being edited. The configurations may include node ID to identify the network devices being targeted. For a distributed edit-config operation, an exemplary XML structure may be as given below depicting the group 1 scenario as discussed in FIG. 1.

```
<?xml version="1.0" encoding="UTF-8"?>
<distributed-edit-config>
<groupId>1</groupId>
<target>
    <running/>
</target>
<node>
    <node-id>1</node-id>
    <config>
        <subtree-A>
            <data1>A1</data1>
            <data2>A2</data2>
        </subtree-A>
    </config>
</node>
<node>
    <node-id>2</node-id>
    <config>
        <subtree-C>
            <data1>C1</data1>
            <data2>C2</data2>
        </subtree-C>
```

```
    </config>
</node>
<node>
    <node-id>3</node-id>
    <config>
        <subtree-E>
            <data1>E1</data1>
        </subtree-E>
    <subtree-F>
            <data1>F1</data1>
        </subtree-F>
    </config>
</node>
</distributed-edit-config>
</xml>
```

The transaction multiplexer 306 may translate the input XML into individual edit-config RPC messages for each network device using a distributed transaction group lookup table (same as the transaction group lookup table 200). The transaction multiplexer 306 may handle these distributed transactions. The translated edit-config RPC messages for each device may look as follows:

```
For node 1
<rpc message-id="101">
    <edit-config>
        <target>
            <running/>
        </target>
<config>
        <subtree-A>
            <data1>A1</data1>
            <data2>A2</data2>
        </subtree-A>
</config>
    </edit-config>
<rpc>
For Node 2
<rpc message-id="201">
    <edit-config>
        <target>
            <running/>
        </target>
    <config>
        <subtree-C>
            <data1>C1</data1>
            <data2>C2</data2>
        </subtree-C>
    </config>
    </edit-config>
<rpc>
For Node 3
<rpc message-id="301">
    <edit-config>
        <target>
            <running/>
        </target>
        <config>
            <subtree-E>
                <data1>E1</data1>
            </subtree-E>
            <subtree-F>
                <data1>F1</data1>
            </subtree-F>
        </config>
    </edit-config>
<rpc>
```

For example, a distributed transaction group YANG may be as follows:

```
module distributed-transaction-group {
  yang-version 1;
  namespace "urn:example:distributed-transaction-group";
  prefix "dtg";
  organization "example";
  contact "https://www.example.com/";
  description "Defines the YANG model for distributed configuration support";
  revision 2022-03-25 { reference "Initial revision"; }
  container distributed-transaction-group {
    description "Represents a list of a configuration subtree groups
    which are part of distributed transaction";
    list dgroup {
      key dgroup-id;
      description "List of configuration subtree groups";
```

-continued

```
      leaf dgroup-id {
        type int32 { range "1 ..200"; }
        description "Unique identifier for a distributed configuration
        group across devices";
      }
      leaf-list path-ref {
        type string;
        description "List of subtree references to YANG modules
        in a device.";
      }
    }
  }
}
```

For example a device-1.YANG (a data model on device node-id 1 whose subtree is referenced in the above YANG) may be as follows:

```
module device-1 {
  yang-version 1;
  namespace "urn:example:device-1:1.0";
  prefix "device-1";
  organization "example.com";
  contact "https://www.example.com/";
  description "Example YANG defining dummy configurations on device-1";
    revision 2022-03-25 {
    description
      "initial revision";
    reference
      "test stub";
  }
    container subtree-A {
      description "Represents subtree-A of a device-1";
      leaf data1 {
        type string;
        description "Represents leaf of the subtree.";
      }
      leaf data2 {
        type string ;
        description "Represents leaf of the subtree.";
      }
    }
    container subtree-B {
      description "Represents subtree-B of a device-1";
      leaf data1 {
      type string;
      description "Represents leaf of the subtree.";
      }
      leaf data2 {
      type string ;
      description "Represents leaf of subtree.";
      }
    }
}
XML output of the device node-id 1 configuration groups:
<distributed-transaction-group  xmlns="urn:example:distributed-transaction-group">
  <dgroup>
    <dgroup-id>1</dgroup-id>
    <path-ref>/device-1:subtree-A</path-ref>
  </dgroup>
  <dgroup>
    <dgroup-id>2</dgroup-id>
    <path-ref>/device-1:subtree-B</path-ref>
  </dgroup>
</distributed-transaction-group>
```

It should be noted that the systems 100 may be implemented in programmable hardware devices such as programmable gate arrays, programmable array logic, programmable logic devices, or the like. Alternatively, the systems 100, may be implemented in software for execution by various types of processors. An identified engine/module of executable code may, for instance, include one or more physical or logical blocks of computer instructions which may, for instance, be organized as a component, module, procedure, function, or other construct. Nevertheless, the executables of an identified engine/module need not be physically located together but may include disparate instructions stored in different locations which, when joined logically together, comprise the identified engine/module and achieve the stated purpose of the identified engine/module. Indeed, an engine or a module of executable code may be a single instruction, or many instructions, and may even be distributed over several different code segments, among different applications, and across several memory devices.

As will be appreciated by one skilled in the art, a variety of processes may be employed for managing distributed configuration transactions across a plurality of network devices. For example, the system 100 may manage distributed configuration transactions across a plurality of network devices, by the process discussed herein. In particular, as will be appreciated by those of ordinary skill in the art, control logic and/or automated routines for performing the techniques and steps described herein may be implemented by the system 100 either by hardware, software, or combinations of hardware and software. For example, suitable code may be accessed and executed by the one or more processors on the system 100 to perform some or all of the techniques described herein. Similarly, application specific integrated circuits (ASICs) configured to perform some or all the processes described herein may be included in the one or more processors on the system.

Figure 4:
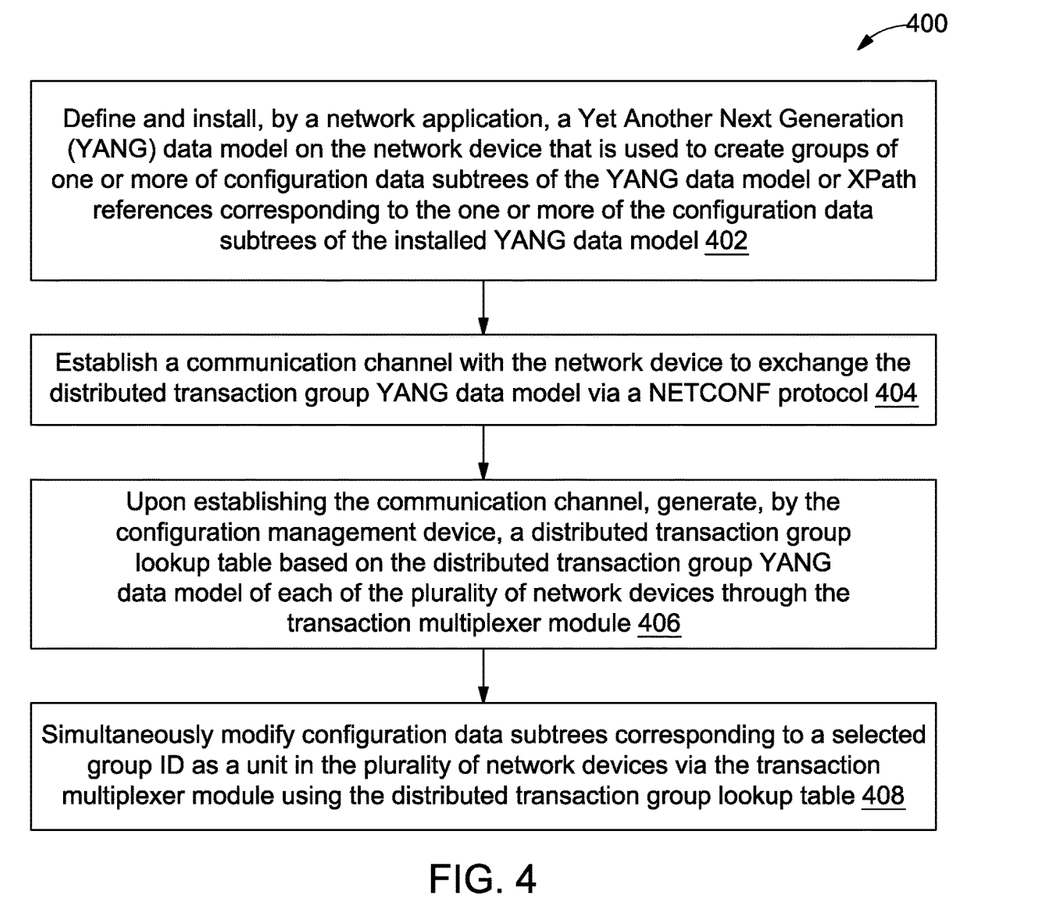
FIG. 4 illustrates a flowchart of an exemplary process of managing distributed configuration transactions across a plurality of network devices, in accordance with some embodiments of the present disclosure.

Referring now to FIG. 4, a process 400 of managing distributed configuration transactions across a plurality of network devices (same as the network devices 102a, 102b, and 102c) is depicted via a flowchart, in accordance with some embodiments of the present disclosure. Each step of the process 400 is performed using a configuration management device (such as the configuration management device 104). FIG. 4 is explained in conjunction with FIGS. 1-3.

At step 402, defining and installing, by a network application, a YANG data model (such as, the YANG data model 106a, the YANG data model 106b, and the YANG data model 106c) on a network device (for example, the network device 102a, the network device 102b, the network device 102c). This step is performed for each network device from the plurality of network devices. The YANG data model is used to create groups of one or more of configuration data subtrees of the YANG data model or XPath references corresponding to the one or more of the configuration data subtrees of the installed YANG data model. Each of the groups includes a unique group ID and the XPath references in a distributed transaction group YANG data model (such as, the distributed transaction group YANG data model 108a, the distributed transaction group YANG data model 108b, and the distributed transaction group YANG data model 108c). It should be noted that the configuration management device may include a transaction multiplexer module (such as the transaction multiplexer 110). The transaction multiplexer module may be a part of a NETCONF client application. In some embodiments, the group ID may be defined for each of the one or more of the configuration data subtrees in run-time. Alternatively, in some other embodiments, the group ID may be defined for each of the one or more of the configuration data subtrees during initialization.

At step 404, a communication channel (for example, Secure Shell (SSH) communication channels or Transport Layer Security (TLS) communication channels) with the network device may be established. The communication channel may be established to exchange the distributed transaction group YANG data model via a NETCONF protocol. This step may be performed for each network device from the plurality of network devices.

Upon establishing the communication channel, at step 406, a distributed transaction group lookup table (for example, the distributed transaction group lookup table 112) may be generated. The distributed transaction group lookup table may be generated based on the distributed transaction group YANG data model of each of the plurality of network devices and through the transaction multiplexer module. The distributed transaction group lookup table may include a mapping of the group IDs, a network device node ID, session IDs, and the XPath references of the configuration data subtrees corresponding to each of the plurality of network devices.

In some embodiments, to generate the distributed transaction group lookup table, a request may be initiated to exchange distributed configuration groups from the distributed transaction group YANG data model upon establishing the communication channel with each of the plurality of network devices via a NETCONF protocol. Each of the distributed configuration groups may include an associated group ID. Further, based on the distributed configuration groups, the distributed transaction group lookup table may be generated.

Thereafter, at step 408, configuration data subtrees corresponding to a selected group ID in the plurality of network devices may be modified simultaneously as a unit. Modification may be performed by the transaction multiplexer module using the distributed transaction group lookup table. It may be noted that the modification may include editing a configuration datastore by creating, deleting, merging, or replacing content. In some embodiments, the modified distributed configuration data may be received for the selected group ID in an XML file from a network application. The modified distributed configuration data may include modified configuration data for the selected group ID corresponding to each of the plurality of network devices. Further, in some embodiments, the XML file may be transformed into an edit configuration Remote Procedure Call (RPC) message for each of the plurality of network devices via the transaction multiplexer module. For transforming the XML file, the distributed transaction group lookup table may be considered. It should be noted that the edit configuration RPC message corresponding to a network device may include the modified distributed configuration data corresponding to the network device node ID. Additionally, in some embodiments, the edit configuration RPC message may be transmitted from the transaction multiplexer module to each of the plurality of network devices over the communication channel.

In some embodiments, data corresponding to the configuration data subtrees may be deleted for the selected group ID in one or more of the plurality of network devices. The data may be deleted through the modified distributed configuration data using the distributed transaction group lookup table.

Figure 5:
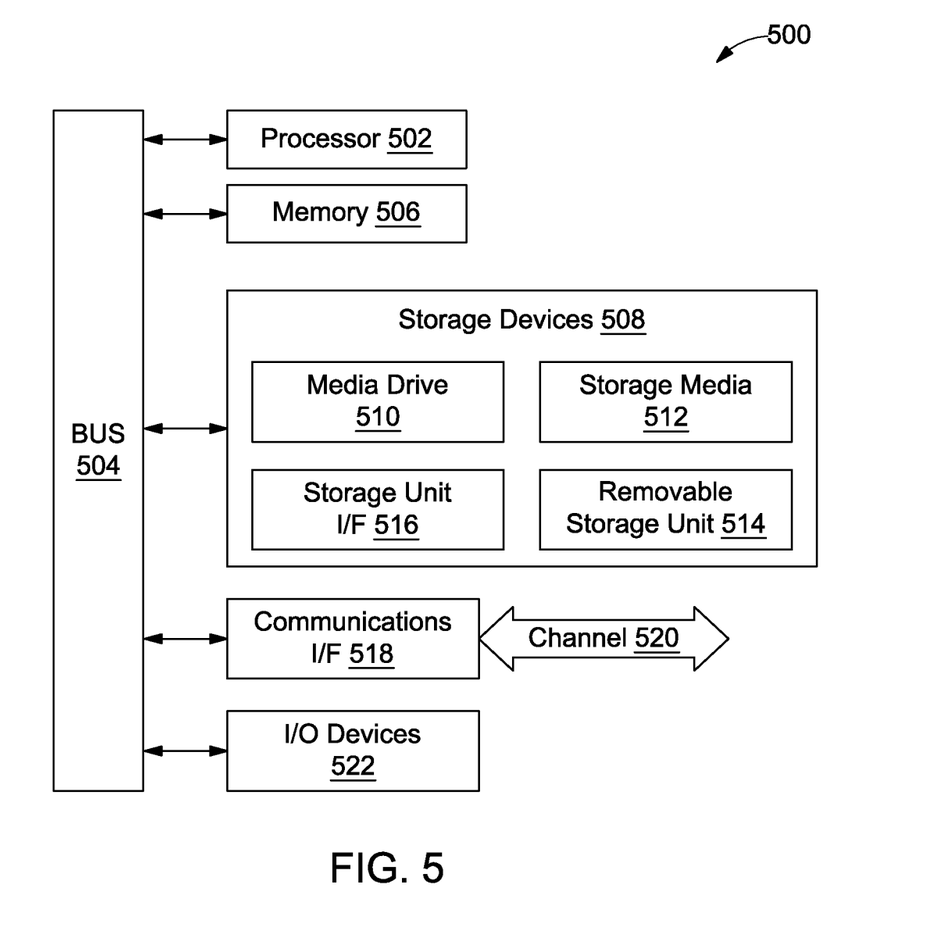
FIG. 5 is a block diagram of an exemplary computer system for implementing embodiments consistent with the present disclosure.

The disclosed methods and systems may be implemented on a conventional or a general-purpose computer system, such as a personal computer (PC) or server computer. Referring now to FIG. 5, an exemplary computing system 500 that may be employed to implement processing functionality for various embodiments (e.g., as a SIMD device, client device, server device, one or more processors, or the like) is illustrated. Those skilled in the relevant art will also recognize how to implement the invention using other computer systems or architectures. The computing system 500 may represent, for example, a user device such as a desktop, a laptop, a mobile phone, personal entertainment device, DVR, and so on, or any other type of special or general-purpose computing device as may be desirable or appropriate for a given application or environment. The computing system 500 may include one or more processors, such as a processor 502 that may be implemented using a general or special purpose processing engine such as, for example, a microprocessor, microcontroller or other control logic. In this example, the processor 802 is connected to a bus 502 or other communication medium. In some embodiments, the processor 502 may be an AI processor, which may be implemented as a Tensor Processing Unit (TPU), or a graphical processor unit, or a custom programmable solution Field-Programmable Gate Array (FPGA).

The computing system 500 may also include a memory 506 (main memory), for example, Random Access Memory (RAM) or other dynamic memory, for storing information and instructions to be executed by the processor 502. The memory 506 also may be used for storing temporary variables or other intermediate information during execution of instructions to be executed by the processor 502. The computing system 500 may likewise include a read only memory ("ROM") or other static storage device coupled to bus 504 for storing static information and instructions for the processor 502.

The computing system 500 may also include a storage device 508, which may include, for example, a media drives 510 and a removable storage interface. The media drive 510 may include a drive or other mechanism to support fixed or removable storage media, such as a hard disk drive, a floppy disk drive, a magnetic tape drive, an SD card port, a USB port, a micro USB, an optical disk drive, a CD or DVD drive (R or RW), or other removable or fixed media drive. A storage media 512 may include, for example, a hard disk, magnetic tape, flash drive, or other fixed or removable medium that is read by and written to by the media drive 510. As these examples illustrate, the storage media 512 may include a computer-readable storage medium having stored there in particular computer software or data.

In alternative embodiments, the storage devices 508 may include other similar instrumentalities for allowing computer programs or other instructions or data to be loaded into the computing system 500. Such instrumentalities may include, for example, a removable storage unit 514 and a storage unit interface 516, such as a program cartridge and cartridge interface, a removable memory (for example, a flash memory or other removable memory module) and memory slot, and other removable storage units and interfaces that allow software and data to be transferred from the removable storage unit 514 to the computing system 500.

The computing system 500 may also include a communications interface 518. The communications interface 518 may be used to allow software and data to be transferred between the computing system 500 and external devices. Examples of the communications interface 518 may include a network interface (such as an Ethernet or other NIC card), a communications port (such as for example, a USB port, a micro USB port), Near field Communication (NFC), etc. Software and data transferred via the communications interface 518 are in the form of signals which may be electronic, electromagnetic, optical, or other signals capable of being received by the communications interface 518. These signals are provided to the communications interface 518 via a channel 520. The channel 520 may carry signals and may be implemented using a wireless medium, wire or cable, fiber optics, or other communications medium. Some examples of the channel 520 may include a phone line, a cellular phone link, an RF link, a Bluetooth link, a network interface, a local or wide area network, and other communications channels.

The computing system 500 may further include Input/Output (I/O) devices 522. Examples may include, but are not limited to a display, keypad, microphone, audio speakers, vibrating motor, LED lights, etc. The I/O devices 522 may receive input from a user and also display an output of the computation performed by the processor 502. In this document, the terms "computer program product" and "computer-readable medium" may be used generally to refer to media such as, for example, the memory 512, the storage devices 508, the removable storage unit 514, or signal(s) on the channel 520. These and other forms of computer-readable media may be involved in providing one or more sequences of one or more instructions to the processor 502 for execution. Such instructions, generally referred to as "computer program code" (which may be grouped in the form of computer programs or other groupings), when executed, enable the computing system 500 to perform features or functions of embodiments of the present invention.

In an embodiment where the elements are implemented using software, the software may be stored in a computer-readable medium and loaded into the computing system 500 using, for example, the removable storage unit 514, the media drive 510 or the communications interface 518. The control logic (in this example, software instructions or computer program code), when executed by the processor 502, causes the processor 502 to perform the functions of the invention as described herein.

Thus, the present disclosure may overcome drawbacks of traditional systems discussed before. The present disclosure provides a standard single interface for network applications to handle the distributed transactions on multiple NETCONF devices. Further, the YANG model-based transaction grouping provides flexibility to add or alter combinations of such configurations. The initial group configuration on each device may also be altered dynamically on need basis by the applications. The transaction group exchange between the network device and client device, through the YANG model, follows existing hello message and capability exchange mechanism which is part of the NETCONF protocol. So, this does not require any change in the protocol. Further, the complex distributed transactions may be responsibility of the NETCONF client transaction multiplexer function and may be hidden from the network applications. The NETCONF client may have different implementations for the transaction multiplexer to handle distributed transaction that may be agnostic to the network applications.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Although the present invention has been described in connection with some embodiments, it is not intended to be limited to the specific form set forth herein. Rather, the scope of the present invention is limited only by the claims. Additionally, although a feature may appear to be described in connection with particular embodiments, one skilled in the art would recognize that various features of the described embodiments may be combined in accordance with the invention.

Furthermore, although individually listed, a plurality of means, elements or process steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather the feature may be equally applicable to other claim categories, as appropriate.

What is claimed is:

1. A method for managing distributed configuration transactions across a plurality of network devices, the method comprising:
   for each network device from the plurality of network devices,
      defining and installing, by a network application and a configuration management device, a Yet Another Next Generation (YANG) data model on the network device that is used to create groups of one or more of configuration data subtrees of the YANG data model or XPath references corresponding to the one or more of the configuration data subtrees of the installed YANG data model, wherein each of the groups comprises a unique group ID and the XPath references in a distributed transaction group YANG data model, wherein the configuration management device comprises a transaction multiplexer module, and wherein the transaction multiplexer module is a part of a Network Configuration (NETCONF) client application; and
      establishing, by the configuration management device, a communication channel with the network device to exchange the distributed transaction group YANG data model via a NETCONF protocol;
   upon establishing the communication channel, generating, by the configuration management device, a distributed transaction group lookup table based on the distributed transaction group YANG data model of each of the plurality of network devices through the transaction multiplexer module; and
   simultaneously modifying, by the configuration management device, configuration data subtrees corresponding to a selected group ID as a unit in the plurality of network devices via the transaction multiplexer module using the distributed transaction group lookup table, wherein simultaneously modifying the configuration data subtrees comprises:
      receiving, by the configuration management device, the modified distributed configuration data for the selected group ID in an Extensible Markup Language (XML) file from a network application, wherein the modified distributed configuration data comprises modified configuration data for the selected group ID corresponding to each of the plurality of network devices.

2. The method of claim 1, wherein generating the distributed transaction group lookup table comprises:
   upon establishing the communication channel with each of the plurality of network devices, initiating a request to exchange distributed configuration groups from the distributed transaction group YANG data model, wherein each of the distributed configuration groups comprises an associated group ID; and
   generating the distributed transaction group lookup table based on the distributed configuration groups.

3. The method of claim 1, wherein simultaneously modifying the configuration data subtrees comprises:
   transforming, by the configuration management device, the XML file into an edit configuration Remote Procedure Call (RPC) message for each of the plurality of network devices via the transaction multiplexer module based on the distributed transaction group lookup table, wherein the edit configuration RPC message corresponding to a network device comprises the modified distributed configuration data corresponding to the network device node ID.

4. The method of claim 3, further comprising transmitting, by the configuration management device, the edit configuration RPC message from the transaction multiplexer module to each of the plurality of network devices over the communication channel.

5. The method of claim 3, further comprising deleting data corresponding to the configuration data subtrees for the selected group ID in one or more of the plurality of network devices through the modified distributed configuration data using the distributed transaction group lookup table.

6. The method of claim 1, wherein defining and installing a YANG data model on the network device to define the group ID for one or more of the configuration data subtrees comprises, one of:
   defining the group ID for each of the one or more of the configuration data subtrees in run-time; or
   defining the group ID for each of the one or more of the configuration data subtrees during initialization.

7. The method of claim 1, wherein the distributed transaction group lookup table comprises a mapping of the group IDs, a network device node ID, session IDs, and the XPath references of the configuration data subtrees corresponding to each of the plurality of network devices.

8. A system for managing distributed configuration transactions across a plurality of network devices, the system comprising:
   a configuration management device comprising:
      a processor; and
      a memory communicatively coupled to the processor, wherein the memory stores processor-executable instructions, which, on execution, cause the processor to:
         for each network device from a plurality of network devices,
            define and install, by a network application, a Yet Another Next Generation (YANG) data model on the network device that is used to create groups of one or more of configuration data subtrees of the YANG data model or XPath references corresponding to the one or more of the configuration data subtrees of the installed YANG data model, wherein each of the groups comprises a unique group ID and the XPath references in a distributed transaction group YANG data model, wherein the configuration management device comprises a transaction multiplexer module, and wherein the transaction multiplexer module is a part of a Network Configuration (NETCONF) client application; and establish a communication channel with the network device to exchange the distributed transaction group YANG data model via a NETCONF protocol;

upon establishing the communication channel, generate a distributed transaction group lookup table based on the distributed transaction group YANG data model of each of the plurality of network devices through the transaction multiplexer module; and simultaneously modify configuration data subtrees corresponding to a selected group ID as a unit in the plurality of network devices via the transaction multiplexer module using the distributed transaction group lookup table, wherein simultaneously modifying the configuration data subtrees comprises receiving the modified distributed configuration data for the selected group ID in an Extensible Markup Language (XML) file from a network application, wherein the modified distributed configuration data comprises modified configuration data for the selected group ID corresponding to each of the plurality of network devices.

9. The system of claim 8, wherein the processor-executable instructions further cause the processor to generate the distributed transaction group lookup table by:

initiating a request to exchange distributed configuration groups from the distributed transaction group YANG data model upon establishing the communication channel with each of the plurality of network devices, wherein each of the distributed configuration groups comprises an associated group ID; and generating the distributed transaction group lookup table based on the distributed configuration groups.

10. The system of claim 8, wherein the processor-executable instructions further cause the processor to simultaneously modify the configuration data subtrees by:

transforming the XML file into an edit configuration Remote Procedure Call (RPC) message for each of the plurality of network devices via the transaction multiplexer module based on the distributed transaction group lookup table, wherein the edit configuration RPC message corresponding to a network device comprises the modified distributed configuration data corresponding to the network device node ID.

11. The system of claim 10, wherein the processor-executable instructions further cause the processor to transmit the edit configuration RPC message from the transaction multiplexer module to each of the plurality of network devices over the communication channel.

12. The system of claim 10, wherein the processor-executable instructions further cause the processor to delete data corresponding to the configuration data subtrees for the selected group ID in one or more of the plurality of network devices through the modified distributed configuration data using the distributed transaction group lookup table.

13. The system of claim 8, wherein the processor-executable instructions further cause the processor to define and install a YANG data model on the network device to define the group ID for one or more of the configuration data subtrees by, one of:

defining the group ID for each of the one or more of the configuration data subtrees in run-time; or defining the group ID for each of the one or more of the configuration data subtrees during initialization.

14. The system of claim 8, wherein the distributed transaction group lookup table comprises a mapping of the group IDs, a network device node ID, session IDs, and the XPath references of the configuration data subtrees corresponding to each of the plurality of network devices.

15. A non-transitory computer-readable medium storing computer-executable instructions for managing distributed configuration transactions across a plurality of network devices by a configuration management device, the computer-executable instructions configured for:

for each network device from a plurality of network devices, defining and installing, by a network application, a Yet Another Next Generation (YANG) data model on the network device that is used to create groups of one or more of configuration data subtrees of the YANG data model or XPath references corresponding to the one or more of the configuration data subtrees of the installed YANG data model, wherein each of the groups comprises a unique group ID and the XPath references in a distributed transaction group YANG data model, wherein the configuration management device comprises a transaction multiplexer module, and wherein the transaction multiplexer module is a part of a Network Configuration (NETCONF) client application; and establishing a communication channel with the network device to exchange the distributed transaction group YANG data model via a NETCONF protocol;

upon establishing the communication channel, generating a distributed transaction group lookup table based on the distributed transaction group YANG data model of each of the plurality of network devices through the transaction multiplexer module; and simultaneously modifying configuration data subtrees corresponding to a selected group ID as a unit in the plurality of network devices via the transaction multiplexer module using the distributed transaction group lookup table, wherein simultaneously modifying configuration data subtrees comprises receiving the modified distributed configuration data for the selected group ID in an Extensible Markup Language (XML) file from a network application, wherein the modified distributed configuration data comprises modified configuration data for the selected group ID corresponding to each of the plurality of network devices.

16. The non-transitory computer-readable medium of the claim 15, wherein the computer-executable instructions are configured for:

upon establishing the communication channel with each of the plurality of network devices, initiating a request to exchange distributed configuration groups from the distributed transaction group YANG data model, wherein each of the distributed configuration groups comprises an associated group ID; and generating the distributed transaction group lookup table based on the distributed configuration groups.

17. The non-transitory computer-readable medium of the claim 15, wherein for simultaneously modifying configuration data subtrees, the computer-executable instructions are configured for:
  transforming the XML file into an edit configuration Remote Procedure Call (RPC) message for each of the plurality of network devices via the transaction multiplexer module based on the distributed transaction group lookup table, wherein the edit configuration RPC message corresponding to a network device comprises the modified distributed configuration data corresponding to the network device node ID.

18. The non-transitory computer-readable medium of the claim 17, wherein the computer-executable instructions are configured for transmitting the edit configuration RPC message from the transaction multiplexer module to each of the plurality of network devices over the communication channel.

19. The non-transitory computer-readable medium of the claim 17, wherein the computer-executable instructions are configured for deleting data corresponding to the configuration data subtrees for the selected group ID in one or more of the plurality of network devices through the modified distributed configuration data using the distributed transaction group lookup table.

20. The non-transitory computer-readable medium of the claim 15, wherein for defining and installing a YANG data model on the network device to define the group ID for one or more of the configuration data subtrees, the computer-executable instructions are configured for, one of:
  defining the group ID for each of the one or more of the configuration data subtrees in run-time; or
  defining the group ID for each of the one or more of the configuration data subtrees during initialization.

* * * * *